United States Patent
Sommers et al.

(10) Patent No.: US 12,399,731 B2
(45) Date of Patent: Aug. 26, 2025

(54) METHODS, SYSTEMS, AND COMPUTER READABLE MEDIA FOR CUSTOMIZING DATA PLANE PIPELINE PROCESSING USING BERKELEY PACKET FILTER (BPF) HOOK ENTRY POINTS

(71) Applicant: Keysight Technologies, Inc., Santa Rosa, CA (US)

(72) Inventors: Christian Paul Sommers, Bangor, CA (US); Matthew R. Bergeron, Sunol, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 498 days.

(21) Appl. No.: 17/572,568

(22) Filed: Jan. 10, 2022

(65) Prior Publication Data

US 2023/0221975 A1 Jul. 13, 2023

(51) Int. Cl.
*G06F 9/455* (2018.01)
*G06F 8/60* (2018.01)
(Continued)

(52) U.S. Cl.
CPC ............ *G06F 9/45558* (2013.01); *G06F 8/60* (2013.01); *G06F 8/65* (2013.01); *G06F 9/30079* (2013.01);
(Continued)

(58) Field of Classification Search
CPC ..... G06F 8/41; G06F 8/60; G06F 8/65; G06F 9/44526; G06F 9/30079; G06F 9/455;
(Continued)

(56) References Cited

U.S. PATENT DOCUMENTS 8,726,394 B2 5/2014 Maor
11,474,823 B2 10/2022 Sommers
(Continued)

FOREIGN PATENT DOCUMENTS

WO 2023017350 A1 2/2023

OTHER PUBLICATIONS

Miano et al., "A Framework for eBPF-Based Network Functions in an Era of Microservices", IEEE Transactions on Network and Service Management, vol. 18, No. 1, Mar. 2021, pp. 133-151 (Year: 2021).*

(Continued)

*Primary Examiner* — Charles M Swift (57) ABSTRACT

A method for customizing data plane pipeline processing to generate test packets using Berkeley packet filter (BPF) hook entry points is disclosed. The method includes receiving a program code script for customizing a performance of one or more stages of a multistage processing pipeline platform configured for conducting a network operation process, wherein the multistage processing pipeline platform includes one or more predefined hook entry points and compiling the program code script to generate a customized plug-in component that is deployed in at least one of the one or more predefined hook entry points of the multistage processing pipeline platform. The method further includes initiating execution of the customized plug-in component in response to a triggering of the at least one of the one or more predefined hook entry points of a stage element of the multistage processing pipeline platform, wherein the execution of the customized plug-in component dynamically configures at least one feature of the network operation process at runtime.

14 Claims, 3 Drawing Sheets

(51) Int. Cl.
  *G06F 8/65* (2018.01)
  *G06F 9/30* (2018.01)
  *G06F 9/44* (2018.01)
  *G06F 9/445* (2018.01)
  *G06F 11/30* (2006.01)

(52) U.S. Cl.
  CPC .......... *G06F 9/44526* (2013.01); *G06F 9/455* (2013.01); *G06F 11/30* (2013.01); *G06F 2009/4557* (2013.01); *G06F 2009/45579* (2013.01)

(58) Field of Classification Search
  CPC ......... G06F 9/45558; G06F 2009/4557; G06F 2009/45579; G06F 11/30; H04L 41/0895; H04L 41/20; H04L 43/02; H04L 43/14; H04L 43/20; H04L 43/50
  See application file for complete search history.

(56) References Cited

U.S. PATENT DOCUMENTS

| | | | |
|---|---|---|---|
| 12,019,505 B2 | 6/2024 | Singh et al. | |
| 12,170,605 B1 | 12/2024 | Chifor et al. | |
| 2004/0210665 A1* | 10/2004 | Fujinami | H04L 43/50 709/230 |
| 2008/0137543 A1* | 6/2008 | Mitra | H04L 43/50 370/242 |
| 2013/0219222 A1 | 8/2013 | Xue | |
| 2015/0100831 A1 | 4/2015 | Nanjundappa | |
| 2015/0331779 A1 | 11/2015 | Subramaniam | |
| 2016/0309434 A1 | 10/2016 | Regev | |
| 2019/0253335 A1* | 8/2019 | Yadav | H04L 43/50 |
| 2019/0306282 A1 | 10/2019 | Masputra | |
| 2019/0327315 A1 | 10/2019 | Grooters | |
| 2020/0213212 A1* | 7/2020 | Dillon | H04L 43/0829 |
| 2020/0403905 A1 | 12/2020 | Allen et al. | |
| 2021/0314247 A1 | 10/2021 | Wright | |
| 2022/0147542 A1 | 5/2022 | Asgar et al. | |
| 2023/0017350 A1 | 1/2023 | Chanemougame et al. | |
| 2023/0071504 A1 | 3/2023 | Wright | |
| 2023/0119536 A1 | 4/2023 | Cosentino et al. | |
| 2023/0155916 A1 | 5/2023 | Shen | |
| 2024/0028443 A1 | 1/2024 | Singh | |

OTHER PUBLICATIONS

EBPF Documentation, www. (list URL) (2023).
Pluginized_QUIC_2021_UCLouvain (https://pquic.org).
Piraux, M. et al., "QUIC_Plugins" pp. 1-14, Mar. 9, 2020.
De Coninck, et al., "The Case for Protocol Plugins," UCLouvain, Belgium 2023.
De Coninck, et al., "Pluginizing QUIC," In SIGCOMM '19: 2019 Conference of the ACM Special Interest Group on Data Communication, Aug. 19-23, 2019, Beijing, China. pp. 59-74.
Hawkeye—Active Network Monitoring Platform, pp. 1-9, Apr. 28, 2023. 7019-0137EN.
Hawkeye on the Cisco Catalyst 9300: CLI Instructions for Running a Docker Instance, Sep. 30, 2019, 7119-1134EN.
"EBPF Library Ecosystem Overview: Go, Rust, Python, C and Other Languages," The Libraries, https://github.com/kcq/ebpf-libraries/blob/master/ebpfSummit_2021_-_eBPF_Library_Ecosystem_Overview.md, pp. 1-9 (2021).
Mayer et al., "Performance Monitoring with H2: Hybrid Kernel/eBPF data plane for SRv6 based Hybrid SDN," Computer Networks, vol. 185, pp. 1-10 (2021).
"What is eBPF?," eBPF, https://ebpf.io, pp. 1-5 (2021).
Suo et al., "Demo/Poster Abstract: Efficient and Flexible Packet Tracing for Virtualized Networks using eBPF," 2018 IEEE Conference on Computer Communications Poster and Demo (INFOCOM'18 Poster/Demo), pp. 1-2 (2018).
"BPF, eBPF, XDP and Bpfilter . . . What are These Things and What do They Mean for the Enterprise?," Netronome, https://www.netronome.com/blog/bpf-ebpf-xdp-and-bpfilter-what-are-these-things-and-what-do-they-mean-enterprise/, pp. 1-14 (Apr. 16, 2018).
"BPF and XDP Reference Guide," Cilium, pp. 1-115 (2017).
"A thorough introduction to eBPF," LWN.net, pp. 1-9 (Dec. 2, 2017).
"Linux Extended BPF (eBPF) Tracing Tools," https://www.brendangregg.com/ebpf.html, pp. 1-32 (Dec. 28, 2016).
Ahmed et al., "InKeV: In-Kernel Distributed Network Virtualization for DCN," ACM SIGCOMM Computer Communication Review, vol. 46, Issue 3, pp. 1-6 (Jul. 2016).
Commonly-Assigned, co-pending U.S. Appl. No. 18/234,855 for "Methods, Systems, and Computer Readable Media for Injecting Test Plugins Into User-Space Network Protocol Stack Executing on Device Under Test (DUT) and Executing Test Plugins During Testing of DUT" (Unpublished, filed Aug. 16, 2023).
Hemminger, "NETDEV 2.2 The Technical Conference on Linux Networking", Nov. 8, 2017 URL: https://www.youtube.com/watch?v=RY6mzwHUKCA.
Bigelow, "An introduction to eBPF and where it shines", Tech Target, pp. 1-4 (2021). https://www.techtarget.com/searchitoperations/tip/Anintroduction-to-eBPF-and-where-it-shines.
Search Report for GB Patent Application Serial No. 2300174.6 (Jun. 29, 2023).
Non-Final Office Action for U.S. Appl. No. 18/234,855 (Apr. 10, 2024).
Notice of Allowance for U.S. Appl. No. 18/234,855 (Aug. 12, 2024).

* cited by examiner

METHODS, SYSTEMS, AND COMPUTER READABLE MEDIA FOR CUSTOMIZING DATA PLANE PIPELINE PROCESSING USING BERKELEY PACKET FILTER (BPF) HOOK ENTRY POINTS

TECHNICAL FIELD

The subject matter described herein relates to the customization of processing pipeline software and/or devices. More particularly, the subject matter described herein relates to methods, systems, and computer readable media for customizing data plane pipeline processing using Berkeley packet filter (BPF) hook entry points.

BACKGROUND

At present, software-based network packet brokers (NPBs) and network traffic generators are frequently being deployed in various communication network environments (e.g., test environments and live network environments). In some implementations, these NPBs and traffic generators can be modeled in software as data plane pipelines with configurable elements. The basic design of the data plane pipelines used to implement the NPBs and/or network traffic generators can largely be characterized as a static model design. While a user or operator can control the behavior of the network elements prior to deployment of the pipeline, the user/operator is typically limited to utilizing preset configuration controls that are constrained by boundaries established by the software producer. Notably, the user or operator is not permitted to utilize the normal configuration interface to create and insert new types of customized elements into the pipeline to derive new behaviors and/or features executed by the data plane pipeline.

In light of these and other difficulties, there exists a need for methods, systems, and computer readable media customizing data plane pipeline processing using BPF hook entry points.

SUMMARY

A method for customizing data plane pipeline processing using Berkeley packet filter (BPF) hook entry points is described herein. The method includes receiving a program code script for customizing a performance of one or more stages of a multistage processing pipeline platform configured for conducting a network operation process, wherein the multistage processing pipeline platform includes one or more predefined hook entry points and compiling the program code script to generate a customized plug-in component that is deployed in at least one of the one or more predefined hook entry points of the multistage processing pipeline platform. The method further includes initiating execution of the customized plug-in component in response to a triggering of the at least one of the one or more predefined hook entry points of a stage element of the multistage processing pipeline platform, wherein the execution of the customized plug-in component dynamically configures at least one feature of the network operation process at runtime.

According to another aspect of the method described herein, the network operation process is a test packet generation process.

According to another aspect of the method described herein, the method further comprising transmitting test packets generated during the network operation process towards a system under test (SUT) in accordance with the at least one feature.

According to another aspect of the method described herein, interpreting, by an orchestration controller, a declarative data model that is representative of the multistage processing pipeline platform and includes the customized plug-in component that is inserted into the multistage processing pipeline platform.

According to another aspect of the method described herein, the network operation process is a packet monitoring operations process.

According to another aspect of the method described herein, transmitting one or more packets in accordance with the at least one feature of the packet monitoring operations process.

According to another aspect of the method described herein, configuring the at least one feature of the packet monitoring operations process includes applying an impairment to an observed packet transmitted by the multistage processing pipeline platform.

According to another aspect of the method described herein, the customized plug-in component is executed as compiled code running in a BPF virtual machine, as compiled code running in a hardware component, as BPF code precompiled into native machine code running on a central processing unit (CPU), or as just-in-time (JIT)-compiled code running on a CPU.

According to another aspect of the method described herein, the method further comprising configuring at least one feature of the test packet generation process includes customizing user defined fields (UDF), payloads, or counters in the generated test packets.

According to another aspect of the method herein, the execution of an event structure in the customized plug-in component triggers the execution of a second customized plug-in component.

According to another aspect of the method herein, an element of the customized plug-in component implements an application programming interface (API) to communicate with a system element that is located external to the multistage processing pipeline platform.

A system for customizing data plane pipeline processing to generate test packets using BPF hook entry points is disclosed. One system comprises a processor for executing a multistage processing pipeline platform configured for conducting a network operations process and a repository component configured to store customized plug-in components that are designed to modify a performance of the multistage processing pipeline platform. The system further includes a plurality of processing pipeline stage elements of the multistage processing pipeline, wherein at least one of the plurality of processing pipeline stage elements includes a hook entry point that triggers an execution of at least one of the customized plug-in components that dynamically configures at least one feature of the network operations process at runtime.

According to another aspect of the system described herein, the network operation process is a test packet generation process.

According to another aspect of the system described herein, a transmit port for transmitting test packets generated during the network operation process towards a SUT in accordance with the at least one feature.

According to another aspect of the system described herein, an orchestration controller that is configured to interpret a declarative data model that is representative of the multistage processing pipeline platform and includes the at least one of the customized plug-in components that is inserted into the multistage processing pipeline platform.

According to another aspect of the system described herein, the network operation process is a packet monitoring operations process.

According to another aspect of the system described herein, a transmit port for transmitting one or more packets in accordance with the at least one feature of the packet monitoring operations process.

According to another aspect of the system described herein, the customized plug-in component is configured for applying an impairment to an observed packet transmitted by the multistage processing pipeline platform.

According to another aspect of the system herein, the execution of an event structure in the customized plug-in component triggers the execution of a second customized plug-in component.

According to another aspect of the system herein, the processor includes a central processing unit (CPU), a field-programmable gate array (FPGA), or an application specific integrated circuit (ASIC).

According to another aspect of the system herein, an element of the customized plug-in component implements an application programming interface (API) to communicate with a system element that is located external to the multistage processing pipeline platform.

According to another aspect of the system herein, the customized plug-in component is executed as compiled code running in a BPF virtual machine, as compiled code running in a hardware component, as BPF code precompiled into native machine code running on a central processing unit (CPU), or as just-in-time (JIT)-compiled code running on a CPU.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for customizing data plane pipeline processing using Berkeley packet filter (BPF) hook entry points. The subject matter described herein addresses several difficulties commonly associated with processing pipeline customizations. Notably, the disclosed subject matter addresses i) how a software-based pipeline platform can allow for more user-defined customization, ii) how new customized plug-in components can be instantiated, configured, monitored, and controlled within an existing platform framework, iii) how workflows can be created to facilitate the creation and use of customized plug-in components (e.g., BPF custom code components), iv) how a graphical user interface (GUI) can utilize the customized plug-in components, and v) how users can promptly determine if a customized plug-in component compiles and/or is performant.

To address these problems, the subject matter described herein includes a system that allows users to create new types of software-based customized plug-in components, which can be inserted into attachment points (e.g., BPF hook entry points) existing in a pipeline platform. Notably, the customized plug-in components provide a mechanism for a user to modify the behavior of an underlying multistage processing pipeline platform during runtime (without the need for recompiling the source code of the pipeline platform). As used herein, a customized plug-in component may include a short user-specified script of programming code (e.g., written in C, P4, or some other programming language) that is tailored to perform a unique task that is not originally enabled by the fixed pipeline platform. In some embodiments, the user can use BPF to write and/or create the customized plug-in component's underlying code in a high-level language. The source code script can then be compiled into bytecode (e.g., a synthetic machine language) by a local compiler component (e.g., a BPF compiler collection (BCC) tool chain and/or P4 tool chain component) for deployment in the processing pipeline platform.

In some embodiments, specific points in a multistage processing pipeline platform are defined or designated as attachment points that can accommodate end-user customization. These specific attachment points or 'hook entry points' may be located in user-space code or in kernel-based code (e.g., in a Linux kernel). Notably, the disclosed subject matter can be utilized by an end-user to create and deploy new hook entry points in the multistage processing pipeline platform. Alternatively, the end-user can identify existing hook entry points that can be improved. In some embodiments, the attachment points are BPF hook entry points.

As used herein, BPF refers to a technology used in computer operating system kernels (e.g., Linux kernel) to manage and coordinate application programs that analyze network packet traffic. For example, BPF can provide useful tools for intrusion detection analysis in network visibility platforms, such as a network packet broker (NPB). In particular, BPF based filtering can be utilized to quickly reduce large packet captures to a smaller set of results by conducting a filtering process that is based on a specific type of network traffic. BPF can also provide packet traffic generation and/or analysis functionalities for software-based network testing devices. In addition, BPF is further used as a catchall term that includes extended Berkeley packet filters (eBPF), which is discussed in greater detail below.

In some embodiments, a BPF filtering mechanism allows a user to write programming code in a subset of the C programming language or other high-level programming languages. After being written, the C-based source code is received by a controller component that can forward the source code to a compiler component configured to compile (and/or transpile) the source code into bytecode. After being compiled, the bytecode can be executed (e.g., run interpretively) by the kernel of the end-user's operating system (OS) software. Alternatively, the bytecode can instead be recompiled into "eBPF" bytecode by a just-in-time (JIT) compiler in the kernel to yield a format that is compatible with the native architecture (e.g., x86, ARM, etc.). In some instances, the JIT-compiler also performs verification of the bytecode to provide protection for and ensure the safety of the Linux kernel. Moreover, the bytecode can be compiled by the JIT-compiler ahead of time to allow for faster installations.

After the compiling process is conducted, the kernel installs the compiled code (i.e., customized plug-in components) into a software program attachment point, i.e., a curated/advertised (e.g., by the platform provider) "hook entry point" that is designated by the operator. The hook entry point may include a function call that specifies the code that is triggered at the location. For example, the hook entry point can specify a trigger for a user space function call, a kernel function call, a kernel system call, an eXpress Data Path (XDP) socket event, a Linux traffic controller (TC) socket event, or the like. Notably, the customized plug-in components may also include these types of function calls to be invoked by the hook entry point (as discussed in greater detail below).

In some embodiments, a customized plug-in component can contain one or more event structures, which may include BPF-supported user space and/or kernel space structures (e.g., maps, event streams, perf streams). For example, the maps and other event structures can be used by the customized plug-in component to interact with the external user space program. The end-user operator can access these event structures in the customized plug-in components using native Linux methods, including BPF libraries and/or the Linux filesystem. The installation of a customized plug-in component into a hook entry point results in performant and deeply embedded custom code. For example, the customized plug-in component can be used for probing, tracing, packet filtering, load balancing, and any other number of purposes. The creation and utilization of the aforementioned customized plug-in components are described in greater detail below. For example, customized plug-in component can be used to modify user defined fields (UDF), payloads, or counters in the test packets. As used herein, UDF refers to the implementation of user-defined packet headers, payload fields, or any other custom packet content or definitions that can be customized by a user or operator.

Figure 1:
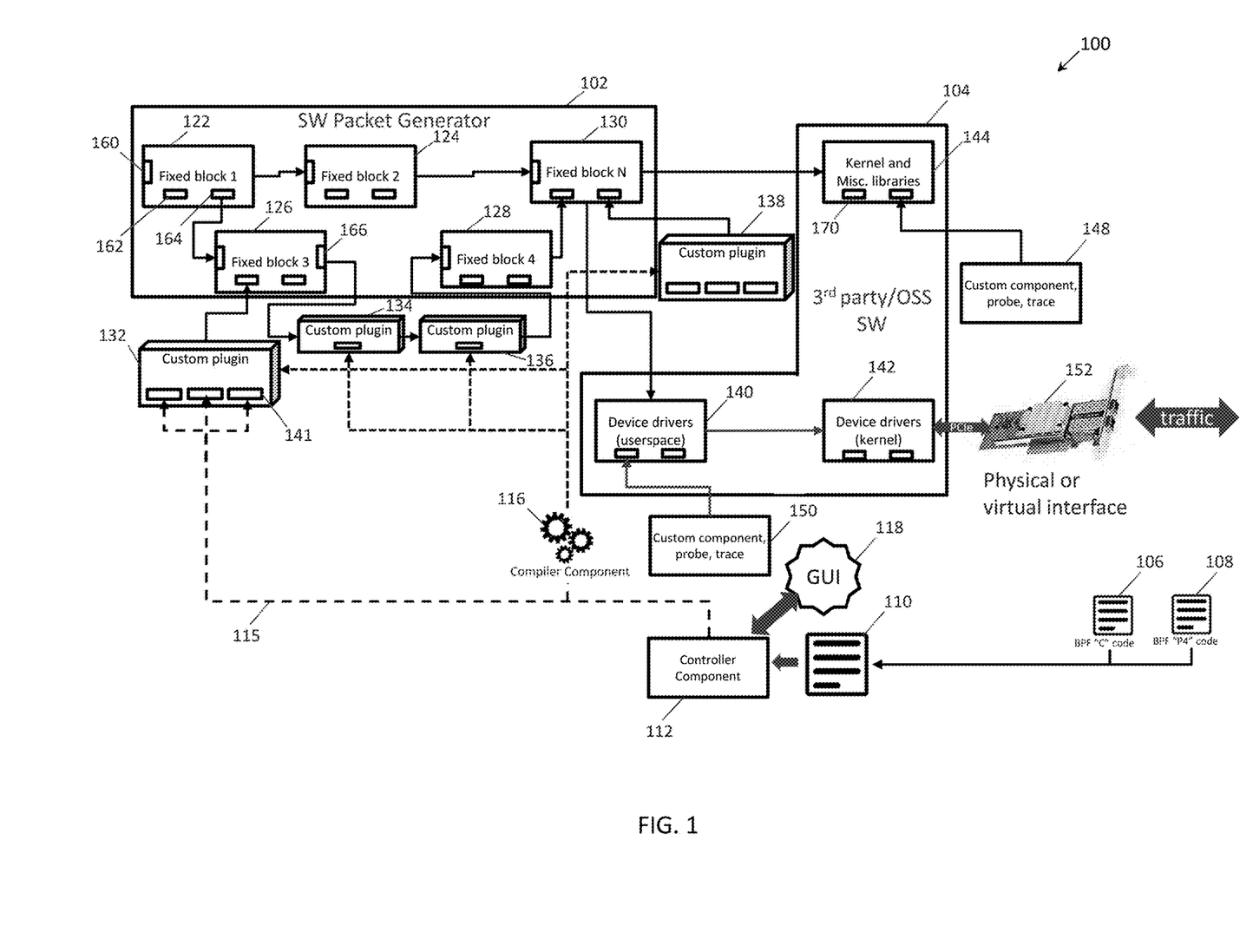
FIG. 1 is a block diagram illustrating an exemplary system for customizing data plane pipeline processing using BPF hook entry points.

FIG. 1 is a block diagram of a system for customizing data plane pipeline processing using BPF hook entry points. Referring to FIG. 1, a processing pipeline platform 100 may be any suitable programmable database pipeline system. Notably, pipeline platform 100 may be implemented as software components and/or one or more hardware devices. In one example, pipeline platform 100 may be a network visibility platform, such as a network packet broker, or a network testing platform, such as a traffic generator. Although a software-based packet generation platform is largely described below as an example, any processing pipeline platform type (e.g., a hardware-based processing pipeline platform) is intended to be within the scope of the subject matter described herein. For example, pipeline platform 100 shown in FIG. 1 can also be configured to receive packets in addition or in lieu of generating/transmitting packets. Notably, the pipeline platform may include a network interface element (e.g., interface element 152) that functions in a bidirectional manner (i.e., configured for both Tx or Rx packet flow). In some embodiments, the network interface element may comprise one or more aggregated building blocks to support any number of transmit and/or receive pipelines.

As shown in FIG. 1, processing pipeline platform 100 may include a software packet generator component 102 and operating system (OS) software component 104. OS software component 104 can include a third-party software component or an open source software component. Notably, packet generator component 102 may include a plurality of fixed function blocks 122-130 (e.g., existing fixed blocks of code), each of which includes one or more BPF hook entry points (e.g., see exemplary hook entry points 161-166 in FIG. 1). The hook entry points included in the fixed function blocks are curated and/or advertised to the end-user for possible points for customization.

Likewise, OS software component 104 in pipeline platform 100 may also contain a number of system components, including device drivers 140 for the user space, device drivers 142 for the kernel space, and a kernel with one or more miscellaneous libraries 144. In particular, device drivers 140 and 142 and kernel (and libraries) 144 can include hook entry points (e.g., hook entry point 165). However, these hook entry points in the OS components are typically built into Linux and can provide tracing or probing functionality for end-users. Further, OS software component 104 can further include a network interface element 152 that is configured to transmit or receive test network packets or live network packets. Network interface element 152 may either be a physical hardware device or a virtual interface component. In some embodiments, the kernel hook entry points can be used for the customization of a resident application (but not necessarily curated by the disclosed subject matter). Kernel 144 and OS component 104 can be stored in memory and executed by one or more processor of a host computing device (e.g. see FIG. 2 as an example). In particular, host computing device can be a standalone computing device, a host computing component that is distributed among one or more computing elements in a computing cloud network, or embodied by one or more virtual machines.

Figure 2:
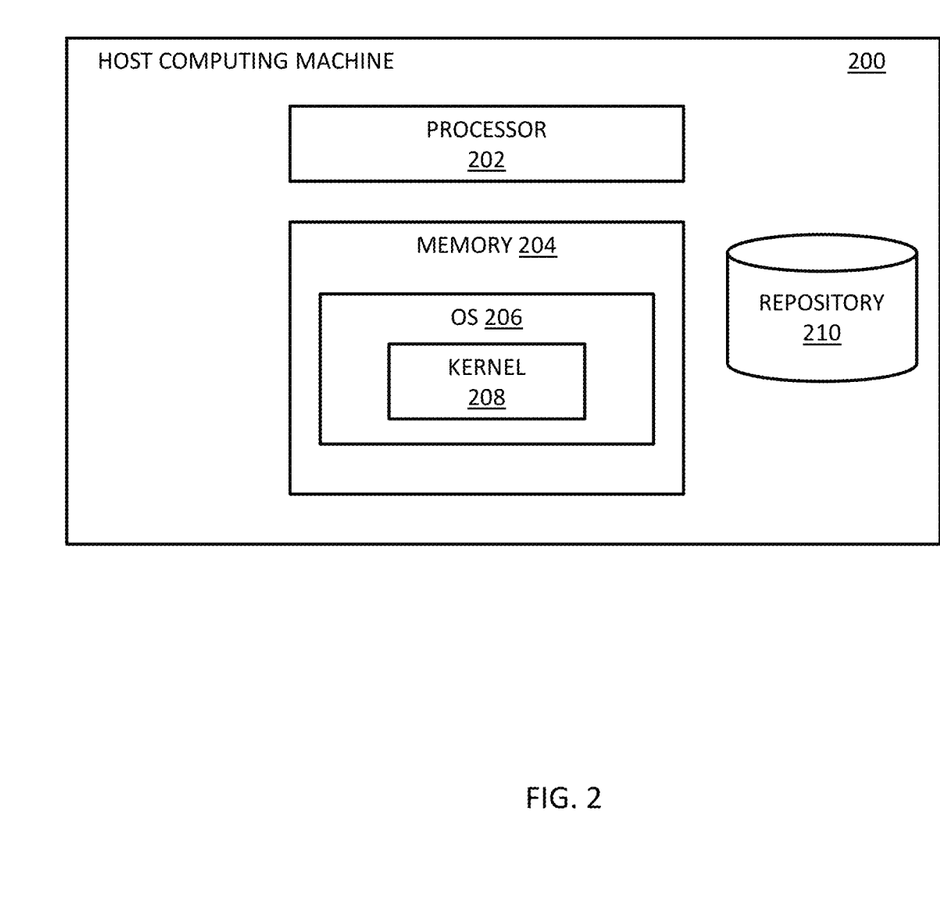
FIG. 2 is a flow chart illustrating an exemplary process for customizing data plane pipeline processing for generating packet traffic using BPF hook entry points.

FIG. 2 is a diagram illustrating an example host computing device 200 that is configured to host a multistage programming pipeline platform (e.g., pipeline platform 100 shown in FIG. 1). Host computing device 200 may represent any suitable entity or entities (e.g., one or more node(s), device(s), or computing platform(s)) for performing various aspects associated with customizing data plane pipeline processing to generate test packets using Berkeley packet filter (BPF) hook entry point. In some embodiments, host computing device 200 may be configured provide any number of network device and/or testing features, such as test packet generation functionality or network packet broker functionality.

As shown host computing device 200 may include at least one processor 202 and memory 204. Processor(s) 202 may include any processing device, such as a central processing unit (CPU), microcontroller, microprocessor, embedded processor, or the like. Memory 204 may include disk memory devices, chip memory devices, programmable logic devices, and application specific integrated circuits. In some embodiments, memory 204 can be used to store an operating system 206, which further includes a kernel 208 (e.g., a Linux kernel). Notably, kernel 208 can be used to execute the customized plug-in components described herein as well as pipeline platforms, such as pipeline platform 100 illustrated in FIG. 1.

Host computing device 200 may also comprise a repository 210, which can include any storage medium that is configured to store and maintain customized plug-in components. Notably, repository 210 may include a plug-in storage that is used to store customized plug-in components that are created by end-users. This repository 210 can also be used to store pre-provisioned customized plug-in components. Further, repository 210 can be configured to store user space applications that operate with the customized plug-in components.

As used herein, the user space is a set of locations where normal user application processes run (e.g., all processes other than the kernel). For example, external applications configured to collect statistics or report events can operate in the user space. Likewise, the role of the kernel is to manage and coordinate applications running in the user space (e.g., to prevent the managed applications from interfering with each other and the host machine). The kernel space as used herein refers to a location where the software code or scripts of the kernel is stored and executed.

Returning to FIG. 1, the fixed function blocks 122-130 of packet generator component 102 and the components of OS software component 104 can be communicatively coupled together directly or via one or more of customized plug-in components 132-138 to form a pipeline chain. Notably, new customized plug-in components can be created for deployment in the processing pipeline platform 100 by platform system components, including controller component 112, compiler component 116 (e.g., BCC/P4 tool chain component), and/or GUI component 118. Examples of customized plug-in components 132-138 include BPF probes or BPF tracers.

In some embodiments, the customized plug-in components comprise impairment plug-ins. More specifically, a customized plug-in component may include a software code component that is associated with the application of a network based and/or test based impairment, such as a time delay, a packet drop, packet corruption, etc., to a transmitted packet. Such impairment operations may be performed on some or all the packets transmitted or generated by the pipeline platform 100. In some embodiments, a user or operator can define and/or create a custom impairment operation that is to be applied to the transmitted and/or generated packets. Notably, this custom impairment operation can be stored and subsequently implemented at runtime as a customized plug-in component. Further, multiple impairment plug-ins can be defined and stored in a plug-in repository (e.g., in repository 210 in FIG. 2), which is accessed and applied by pipeline platform 100 (e.g., a programmable data plane processor-based monitoring system) at run time.

As depicted in FIG. 1, a source code script, such as BPF C code script 106 and/or BPF P4 code script 108 can be written by an end-user using BPF. In some embodiments, the source code script is written using a user space application that is configured to embed the code as inline text (which can be compiled and loaded in one command). After being created/written, the code script is provided to controller component 112 as source code script input 110, which includes declarative data model information. Notably, source code script input 110 may include a data model that establishes or designates the configuration of fixed function blocks. In addition, source code script input 110 can declare the customized plug-in components (that are ultimately generated) via inline declaration or by a reference (e.g., a file name or URL pointing to a remotely-stored file) to associated files. In some embodiments, the topology data and script contents included in source code script input 110 are all declarative and/or model based. In some embodiments, an orchestration controller (e.g., controller component 112) may be configured to interpret a declarative data model that is representative of the multistage processing pipeline platform and includes the at least one of the customized plug-in components that is inserted into the multistage processing pipeline platform. For example, controller component 112 can be configured to interpret a declarative data model related to the processing pipeline platform 100, including embedded or referenced custom code (P4, eBPF, etc.) which can be inserted into the pipeline platform.

After receiving source code script input 110, controller component 112 is configured to parse the programming code script to initiate and coordinate the creation of the associated customized plug-in components. For example, controller component 112 is configured to forward source code script input 110 to a compiler component 116 for processing. In some embodiments, compiler component 116 includes a BCC tool chain compiler, P4 tool chain compiler, Clang compiler, and/or LLVM compiler. Notably, compiler component 116 can compile source code script input 110 to produce BPF bytecode as output. In some instances, the BPF bytecode can be precompiled or can be loaded/attached in the kernel using other techniques (e.g., Linux Traffic Control (TC) queuing Discipline (qdisc)).

In some embodiments, compiler component 116 can be configured to compile the source code script input 110 into an extended BPF (eBPF) bytecode that is compatible and/or useable by virtual machine components in pipeline platform 100. Once compiled by compiler component 116, the eBPF bytecode can be loaded into the kernel. In some embodiments, the kernel first conducts an automatic mandatory bytecode verification process. Notably, only compiled eBPF bytecode that is determined to be safe is accepted. The eBPF bytecode can then be executed by the kernel in an interpretive manner (e.g., similar to a Java virtual machine). Alternatively, the kernel can utilize a just-in-time (JIT) compiler to transpile and/or compile the eBPF bytecode into the native machine code (e.g., x86, ARM, and the like) for full performance.

Once the kernel has compiled the eBPF bytecode, the kernel can begin instantiating the customized plug-in components based on the compiled eBPF code (or machine code) and incorporating the components into the pipeline platform 100. For example, the kernel can attach one or more customized plug-in components to an event, such as a probing event, tracing event, socket, system call, and the like. In some embodiments, the kernel 144 and/or compiler component 116 can be configured to dynamically insert the customized plug-in components into the pipeline platform. The customized plug-in components can include function calls that are accessed when the fixed function blocks of packet generator component 102 are executed. Notably, function calls included in the hook entry points of the fixed function blocks specify the customized plug-in components that are triggered. For example, the function call in the hook entry point can include a trigger that invokes/accesses a specific customized plug-in component.

For example, each of the fixed function blocks 122-130 includes a plurality of curated and/or advertised hook entry points (e.g., hook entry points 160-166) that allow for specific end-user customization. In particular, a hook entry point can specify a customized plug-in component (i.e., code) to be triggered by a function call. In some embodiments, the hook entry point calls the customized plug-in component, which in turn executes its specified functionality. For instance, fixed function block 126 can include a curated or advertised hook entry point that when triggered, calls on customized plug-in component 134, which is notably not an original part of the pipeline chain in software packet generator component 102. In such a scenario, customized plug-in component 134 will dynamically execute its function in the kernel without the need for recompiling the code for software packet generator component 102.

In some embodiments, a first customized plug-in component can be chained or linked (e.g., using tail-calls) to a second customized plug-in component. Referring to FIG. 1, customized plug-in component 134 is chained to customized plug-in component 136. In this depicted scenario, after customized plug-in component 134 is executed, a structure event in component 134 can be triggered to call customized plug-in component 136. Notably, customized plug-in component 136 (and each of customized plug-in components 132-140) includes one or more kernel structures (e.g., event structures) that can be used to invoke other customized plug-in components (or fixed function blocks in the pipeline chain). For example, the event structures in the customized plug-in components can be BPF-supported user space-kernel structures, such as maps, event streams, and perf streams. In some embodiments, end-users can access these kernel structures in the customized plug-in components using native LINUX methods (e.g., BPF libraries and/or Linux filesystem). Once (second) customized plug-in component 136 has executed its functionality, the pipeline platform process that is being executed exits the customized plug-in component and proceeds to the next fixed function block in the packet generator component 102 (i.e., the next fixed function block that may have originally been called on by the fixed function block that was last executed in the pipeline chain).

As a practical example, suppose one stage element (e.g., section) of the processing pipeline platform 100 is configured to create TCP headers for the packet traffic generated by packet generator component 102. Typically, the processing pipeline platform is implemented by a predefined sequential execution of fixed function blocks 122-130 to conduct a function (e.g., generating TCP headers for test packets). For example, after fixed function block 126 has completed executing its functionality, the pipeline chain typically flows uninterrupted to fixed function block 128. In the scenario where customized plug-in component 134 is utilized (e.g., where customized plug-in component 134 is created by an end user for the purpose of adding a special flag or numerical indicator in the TCP header of the test packets), hook entry point 166 of fixed function block 126 can be configured to initiate a function call that invokes a 'trigger code' that is specified in or by customized plug-in component 134. In some embodiments, an end-user programmer is provided knowledge of and/or access to the function call contained in hook entry point 166. The end-user/programmer can subsequently create the source code for customized plug-in component 134 that specifies the trigger code, which is called and/or accessed by the function call of hook entry point 166. Once called and executed by fixed function block 126, customized plug-in component 134 (as well as corresponding customized plug-in component 136) is effectively injected into the fixed pipeline code executed by the kernel.

The insertion of the customized plug-in components dynamically modifies or extends the behavior and packet header generation functionality (i.e., the addition of the aforementioned flag or numerical indicator) of the underlying packet generator component 102. Notably, this injection or insertion of customized plug-in component 134 can be conducted during runtime, thereby immediately modifying the pipeline platform's features and/or functionality. More specifically, the new customized plug-in component can be inserted into the pipeline via BPF hook entry points without the need to recompile the underlying software code of the pipeline platform.

As an example, custom block 134 can modify the TCP packet header contents initially owned/manipulated by 126 (e.g., fixed Block 3), by directly modifying memory contents, accessed via memory pointers, passed as function pointer arguments at hook entry point 166. Other techniques may be used to provide memory references to custom plugins, for example "pinned" BPF map structures established by the fixed-function platform code and made available to one or more plugins by some well-known method. For example, the "fixed" pipeline platform can be designed to be pluggable from the onset and can present predefined hook entry points, which provide direct means to alter the baseline behavior via plugins. This might mean, for example, that dummy function calls are inserted at the hook entry points, which may be configured to do nothing normally. However, the eBPF program of the disclosed subject matter can hook into these entry points to alter the behavior (e.g., modify memory contents or function return values). The functions may also provide function arguments which the eBPF program can easily access to read and/or modify program state.

After customized plug-in component 134 is executed in the kernel space, the operation is returned to the user space, thereby allowing customized plug-in component 134 to modify the memory that corresponds to or represents a portion of the TCP packet header.

Although the above TCP header modification example illustrates that customized plug-in components can be invoked by hook entry points of the fixed function blocks of packet generator component 102, other hooks in the overall pipeline chain can be utilized. For example, customized plug-in components 148-150 can be inserted (i.e., called by) at low level sockets of OS software component 104, such that the entire packet can be accessed in its final form (e.g., prior to the transmission if the packet or immediately upon receiving the packet). Similarly, customized plug-in components can be called by hook entry points associated with device drivers 140-142 in the OS software component 104.

In some embodiments, the pipeline platform may be configured to automatically render an external application programming interface (API) that enables a user or operator to interact with the customized plug-in components. For example, controller component 112 can be utilized to establish at least one external API 115 that can be used to modify or control customized plug-in components (e.g., customized plug-in component 132 shown in FIG. 1). As indicated above, controller component 112 can be configured to interpret and/or manage the data model corresponding to the pipeline platform using API 115. Controller component 112 may also be configured to automatically render API 115 to the customized plug-in components (or other BPF data structures). For example, controller component 112 may include an extended traffic generation proxy that is configured to autorender a custom API associated with one or more customized plug-in components in packet generator component 102. In some embodiments, API 115 is a representational state transfer (REST) API or a gRPC API that is provided by controller component 112 when functioning and/or acting as a proxy.

Once rendered, API 115 can then be used by controller component 112 to proxy an interface to the customized plug-in components in pipeline platform 100. In some embodiments, customized plug-in component 132 comprises bare metal C code that includes read/write registers in its native form. Notably, these registers can be exposed over external API 115, thereby enabling GUI 118 or controller component 112 to modify (e.g., change a plug-in component parameter) and/or control the customized plug-in component. For example, GUI 118 may be a GUI developer environment that can provide a user with interactive process controls that can be used to insert the customized plug-in components. In some embodiments, there is a 1:1 correspondence between GUI(s) 118 and data model instances. Notably, updating a GUI may render the model's declarative data. Likewise, an imported BPF customized plug-in component can render a GUI after validation. In some embodiments, the framework of GUI 118 can provide a user with real-time compiling and hooking-in of customized plug-in components. For example, errors can be displayed and the user can make modifications in real-time via an interactive environment (e.g., such an environment can use an extensible text editor or Integrated Development Environment (IDE), as a framework). Moreover, Linux helpers, component libraries, and wizards can be configured to help users and/or operators. Accordingly, the GUI environment could run the new data plane pipeline platform on the fly, interact with the user, measure performance, and/or display captures (e.g., utilizing an embedded Wireshark application).

In some embodiments, the disclosed subject matter can be used to define a management API that can be used to access the customized plug-in components. In particular, the management API can be defined using simple constructs, e.g., extensions to the open traffic generator (OTG) data model. The customized plug-in components can either be i) declared and instantiated (i.e., installed) or uninstantiated without changing the enhanced data model (i.e., on/off controls for each customized plug-in component). Multiple instances of the same customized plug-in component can be instantiated and uniquely identified and/or labeled.

In some embodiments, the disclosed subject matter may be implemented as an open-source, online ecosystem that contains examples of customized plug-in components provided via community contributions. For example, a new customized plug-in component construct for packet generator component may contain inline BPF code components (e.g., short programs) or a reference to an external file that includes specifiers to where the BPF code component hook entry directs its function call (in the pipeline platform). Further, the BPF customized plug-in components can also specify the user-kernel data structures, such as maps, Linux event streams, and Linux perf streams, which the controller component 112 can proxy and re-render as native APIs. As described above, such APIs may function as go-between to the BPF customized plug-in components.

In some embodiments, the multistage processing pipeline platform along with its underlying fixed components and customized plug-in components (e.g., BPF code) can be executed in a physical computing device, such as a field programmable gate array (FPGA) that is functioning in a hardware data plane. For example, FPGA can be configured to function as a hardware packet generator. Notably, the multistage processing pipeline platform and/or the customized plug-in components can be executed by an FPGA BPF virtual machine that runs BPF bytecode compiled from C source code. In some embodiments, the multistage processing pipeline platform and/or the customized plug-in components can be JIT or offline compiled/transpiled into a lower level FPGA "native" code (e.g., transpiled into FPGA logic block configurations that would allow for a number of performant operations).

Figure 3:
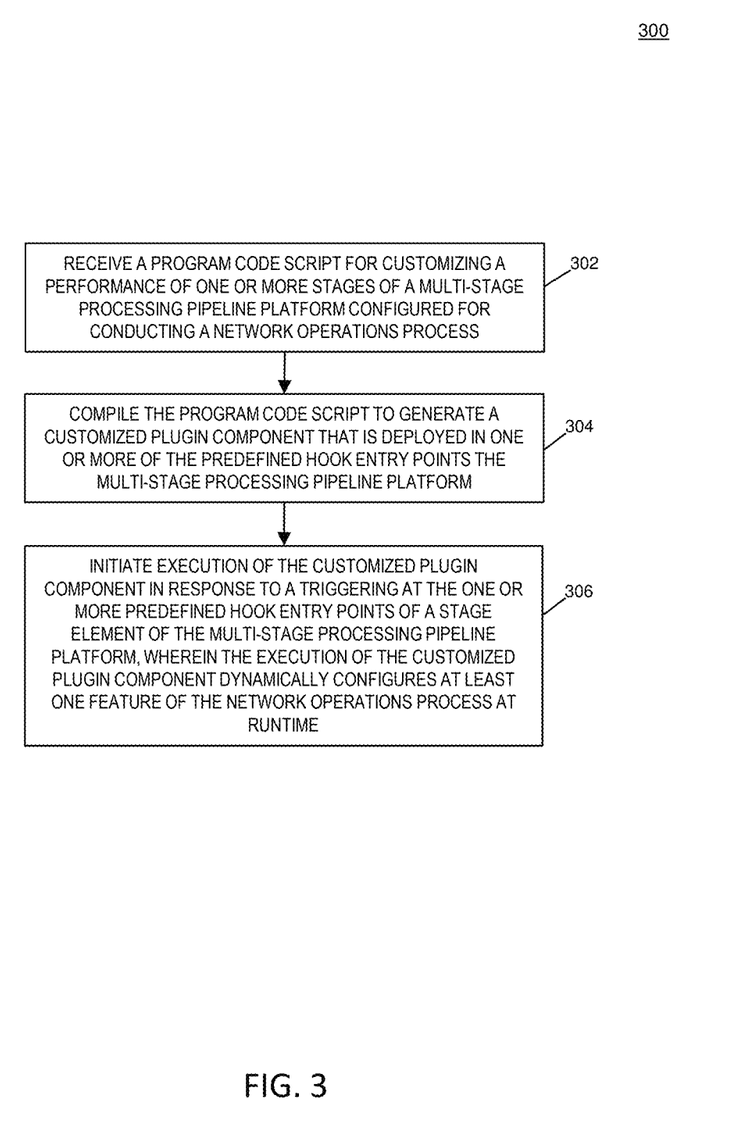
FIG. 3 is a flow chart illustrating an exemplary process for customizing data plane pipeline processing using BPF hook entry points.

FIG. 3 is a flow chart illustrating an example process for customizing data plane pipeline processing using BPF hook entry points according to an embodiment of the subject matter described herein. In some embodiments, method 300 depicted in FIG. 3 is an algorithm, program, or script stored in memory that when executed by a processor performs the steps recited in blocks 302-306. In some embodiments, the method 300 represents a list of steps (or changes in steps) embodied in a virtual machine (e.g., either via software code programming or via a set of rules) and/or in logic of a hardware device.

In block 302, a program code script for customizing a performance of one or more stages of a multistage processing pipeline platform configured for conducting a test packet generation process is received. In some embodiments, an end-user writes BPF source code in a high-level language (e.g., C programming language or some related subset) that is provided to a controller component associated with the multistage processing pipeline platform. Notably, the source code corresponds to a customized plug-in component that will be used to dynamically modify a feature (i.e., a stage) of the processing pipeline platform. In some embodiments, the multistage processing pipeline platform includes a plurality of predefined hook entry points.

In block 304, the program code script is compiled to generate a customized plug-in component that is deployed in one or more of the predefined hook entry points the multistage processing pipeline platform. In some embodiments, the controller component parses the program code script and provides the same to a compiler component (e.g., a BCC tool chain compiler). The compiler component is configured to compile and/or transpile the source code into BPF bytecode. In some embodiments, the bytecode can instead be recompiled into eBPF bytecode by a JIT compiler in the kernel to yield a format that is compatible with the native architecture. Once compiled, the bytecode can be utilized by the system kernel to deploy a customized plug-in component into the pipeline platform.

In block 306, execution of the customized plug-in component is initiated in response to a triggering at the one or more predefined hook entry points of a stage element of the multistage processing pipeline platform, wherein the execution of the customized plug-in component dynamically configures at least one feature of the test packet generation process at runtime. In some embodiments, the kernel executes a stage element of the multistage processing pipeline platform that includes a hook entry point that invokes a customized plug-in component. In response, the kernel inserts the specified customized plug-in component into the multistage processing pipeline chain during runtime. Notably, the code corresponding to the multistage processing pipeline platform does not need to be recompiled in order to insert and execute the specified customized plug-in component.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for customizing data plane pipeline processing to generate test packets using Berkeley packet filter (BPF) hook entry points, the method comprising:

receiving a program code script for customizing a performance of one or more stages of a multistage processing pipeline platform configured for conducting a network operation process, wherein the multistage processing pipeline platform includes one or more predefined hook entry points, wherein the network operation process is a test packet generation process and the multistage processing pipeline platform includes a fixed function block for generating transmission control protocol (TCP) headers for test packets generated by the multistage processing pipeline platform and the one or more predefined hook entry points are located in the fixed function block that generates the TCP headers;

compiling the program code script to generate a customized plug-in component that is invoked by the one or more predefined hook entry points located in the fixed function block that generates the TCP headers, wherein the customized plug-in component adds a flag or numerical indicator in the TCP headers of at least some of the test packets generated by the multistage processing pipeline platform; and initiating execution of the customized plug-in component in response to a triggering of the customized plug-in component by the one or more predefined hook entry points located in the fixed function block that generates the TCP headers, wherein the execution of the customized plug-in component dynamically configures at least one feature of the network operation process at runtime and dynamically modifies or extends packet header generation of the fixed function block at runtime.

2. The method of claim 1 further comprising transmitting test packets generated during the network operation process towards a system under test (SUT) in accordance with the at least one feature.

3. The method of claim 1 including interpreting, by an orchestration controller, a declarative data model that is representative of the multistage processing pipeline platform and includes the customized plug-in component that is inserted into the multistage processing pipeline platform.

4. The method of claim 1 wherein the customized plug-in component is executed as compiled code running in a BPF virtual machine, as compiled code running in a hardware component, as BPF code precompiled into native machine code running on a central processing unit (CPU), or as just-in-time (JIT)-compiled code running on a CPU.

5. The method of claim 1 wherein the execution of an event structure in the customized plug-in component triggers the execution of a second customized plug-in component.

6. The method of claim 1 wherein an element of the customized plug-in component implements an application programming interface (API) to communicate with a system element that is located external to the multistage processing pipeline platform.

7. A system for customizing data plane pipeline processing to generate test packets using Berkeley packet filter (BPF) hook entry points, the system comprising:

a processor for executing a multistage processing pipeline platform configured for conducting a network operation process, wherein the network operation process is a test packet generation process and the multistage processing pipeline platform includes a fixed function block for generating transmission control protocol (TCP) headers for test packets generated by the multistage processing pipeline platform;

a repository component configured to store customized plug-in components that are designed to modify operation of the multistage processing pipeline platform, wherein the fixed function block that generates the TCP headers includes one or more predefined hook entry points; and a plurality of processing pipeline stage elements of the multistage processing pipeline, wherein the one or more predefined hook entry points of the fixed function block that generates the TCP headers trigger execution of at least one of the customized plug-in components that dynamically configures at least one feature of the network operation process at runtime, wherein the at least one of the customized plug-in components whose execution is triggered by the one or more hook entry points of the fixed function block adds a flag or numerical indicator in the TCP headers of at least some of the test packets generated by the multistage processing pipeline platform and dynamically modifies or extends packet header generation of the fixed function block at runtime.

8. The system of claim 7 further comprising a transmit port for transmitting test packets generated during the network operation process towards a system under test (SUT) in accordance with the at least one feature.

9. The system of claim 8 further comprising an orchestration controller that is configured to interpret a declarative data model that is representative of the multistage processing pipeline platform and includes the at least one of the customized plug-in components that is inserted into the multistage processing pipeline platform.

10. The system of claim 7 wherein the customized plug-in component is executed as compiled code running in a BPF virtual machine, as compiled code running in a hardware component, as BPF code precompiled into native machine code running on a central processing unit (CPU), or as just-in-time (JIT)-compiled code running on a CPU.

11. The system of claim 7 wherein the execution of an event structure in the at least one of the customized plug-in triggers the execution of a second customized plug-in component.

12. The system of claim 7 wherein the processor includes a central processing unit (CPU), a field-programmable gate array (FPGA), or an application specific integrated circuit (ASIC).

13. The system of claim 7 wherein an element of the at least one of the customized plug-in implements an application programming interface (API) to communicate with a system element that is located external to the multistage processing pipeline platform.

14. A non-transitory computer readable medium having stored thereon executable instructions that when executed by at least one processor of a computer cause the computer to perform steps comprising:

receiving a program code script for customizing a performance of one or more stages of a multistage processing pipeline platform configured for conducting a network operation process, wherein the multistage processing pipeline platform includes one or more predefined hook entry points, the network operation process is a test packet generation process, the multistage processing pipeline platform includes a fixed function block for generating transmission control protocol (TCP) headers for test packets generated by the multistage processing pipeline platform, and the one or more predefined hook entry points are located in the fixed function block that generates the TCP headers;

compiling the program code script to generate a customized plug-in component that is invoked by the one or more predefined hook entry points located in the fixed function block that generates the TCP headers; and initiating execution of the customized plug-in component in response to a triggering of the customized plug-in component by the one or more predefined hook entry points located in the fixed function block that generates the TCP headers, wherein the execution of the customized plug-in component dynamically configures at least one feature of the network operation process at runtime, wherein the customized plug-in component adds a flag or numerical indicator in the TCP headers of at least some of the test packets generated by the multi-stage processing pipeline platform and dynamically modifies or extends packet header generation of the fixed function block at runtime.

* * * * *